March 24, 1959  T. W. JOHNSON ET AL  2,878,827
AIR CONTROL VALVE
Filed Dec. 4, 1953
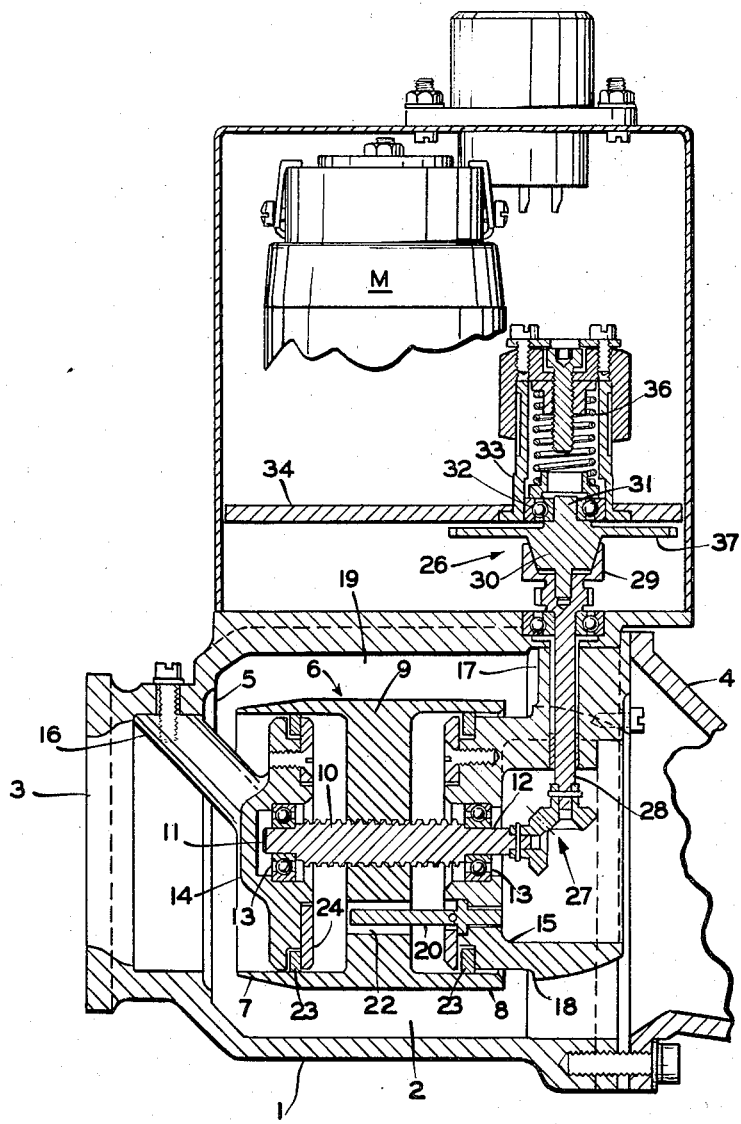
INVENTORS
THOMAS W. JOHNSON
RICHARD H. WOLFF
BY Nicholas J. Garofalo
ATTORNEY

United States Patent Office

2,878,827
Patented Mar. 24, 1959

2,878,827

AIR CONTROL VALVE

Thomas W. Johnson, Westfield, and Richard H. Wolff, Maywood, N.J., assignors to Bendix Aviation Corporation, Teterboro, N.J., a corporation of Delaware Application December 4, 1953, Serial No. 396,224

6 Claims. (Cl. 137—219)

This invention relates in general to air flow controls, and it is particularly concerned with an air valve, suited to servo control and which finds particular use for afterburner control in turbo-jet engines.

A general object of the invention is to provide means for controlling the flow of air to the air turbine which drives the fuel pump in the reheat system of a turbo-jet engine in order to control the speed of the turbine and thereby regulate the amount of fuel delivered by the pump. Control of the afterburner fuel delivery operates to vary the fuel-air ratio to maintain a predetermined temperature in the tail pipe.

Another object of the invention is to provide a controllable valve device useful in regulating the flow of air to an air turbine fuel pump in a jet engine.

A further object of the invention is an improved valve unit useful in controlling air flow to an air turbine driven device.

The invention further lies in the particular organization of the various elements of the invention, as well as in their cooperative association with one another.

The nature of the invention, together with its various advantages, will become readily apparent as this application unfolds in further detail.

In the accompanying drawing, a side elevational view shows an air control valve device embodying the invention.

Referring to the drawing, there is disclosed a valve housing 1 having a chamber 2 which communicates on the left with an intake opening 3 and on the right with a downstream tube 4 serving as an outlet from the chamber. The downstream tube is adapted for communication with an air-turbine that operates an afterburner fuel pump of a turbo-jet engine.

Pressure air entering through the intake 3 passes into the chamber 2 and out of the downstream tube 4. At the point where the intake 3 communicates with chamber 2, there is provided an annular shoulder 5 on which a tubular valve head 6 is adapted to seat and seal the intake. The valve head is partitioned off into a pair of sleeves 7 and 8 by a rib section 9 midway of the valve head. The rib is axially threaded upon an elongated drive screw 10. Ends 11 and 12 of the screw are carried for rotatable movement in bearings 13 mounted axially of a pair of fixed supports 14 and 15. Support 14, in the bearing of which the left end of the screw 10 rotates, is suspended within the chamber 2 on three equi-spaced arms 16 attached to the housing inner wall. The support 15, in the bearing of which the right end of the screw rotates, is suspended within the chamber 2 on three equi-spaced arms 17 secured to housing inner wall. The support 14 is received in the left sleeve portion 7 of the valve head, and the support 15 is received in the right sleeve portion 8.

The supports contain in their peripherial surface sealing rings 23 held in place by retainers 24. When the screw is rotated in its bearings in either direction, the sleeves of the valve head ride over the sealed supports.

The support 15 is provided on its right with an annular shoulder 18 against which the valve head limits when carried by the screw to its fully opened position. When the valve is moved from its seat, air through the intake enters the chamber 2, passes through the space 19 in the chamber around the valve head, and exits out the downstream tube 4.

The valve, when closed, effectively seals the intake 3, and when closed it is not subject to be moved by the upstream pressure, as the latter does not act on any surfaces which are at right angles to the screw line.

The valve head is prevented from rotating with the screw by an elongated pin 20, the head of which is retained in the right support 15 and the shank of which extends into a hole 22 of the rib 9 of the valve head.

The seal rings 23 reduce to a minimum leakage through the sleeve around the bearing supports. Such leakage is prevented from forming an air block between the bearing supports and the valve rib 9 by means of bleeder holes as 22 through the rib. This prevents trapping of air on either side of the rib between the supports. Leakage past the left seal is equalized by the bleeder holes and further downstream leakage through the seal 23 on the right.

The screw 10 is driven by suitable gearing connecting it to a low inertia motor M having a built-in rate generator of conventional type. In order not to damage the gearing when the valve head has limited upon its seat, a suitable clutch assembly 26 of the slip type is provided intermediately of the gear train. To this end, the right end 12 of screw 10 extends beyond its bearing and is connected by bevel gearing 27 with a shaft 28. The upper end of shaft 28 provides a seat 29 in which a cone clutch 30 engages. The upper end of the cone clutch terminates in a stub shaft 31 which is adapted for rotation in a bearing 32 carried in a container 33. The latter is supported on a plate 34 which is mounted at its ends upon suitable bracket supports 35 fixed atop the housing 1.

Suitable screw operated means 36 is provided in the container for adjusting the tension of the engagement of the cone clutch with its seat.

The cone is provided with an annular gear 37 engaged through idle gearing (not shown) with a gear on the motor drive shaft (not shown).

Operation of the motor serves through the gear train and clutch assembly to drive the screw 10 and to carry the valve head to its closed or open position.

Because of its particular construction, any suitable electrical arrangement, such as of the servo type with a follower, may be adapted to control the operation of the motor and the consequent opening or closing of the valve to a proper position, so as to regulate a proper air supply therethrough.

While we have described and illustrated our invention as above, it is our intent, however, to claim the invention not only as shown and described but also in all such forms as may be reasonably construed to be within the spirit of the invention and scope of the appended claims.

What is claimed is:

1. In a screw driven valve of the character described, including a housing having a chamber opening out at one end through an annular inlet valve seat and at the opposite end through an outlet of the housing, a pair of annular support members held in axial spaced relation to one another within the chamber, an elongated open ended cylinder member sleeving the supports at opposite ends for slidable movement over them and radially spaced from the wall of said chamber to provide an annular passage, an elongated screw member journalled axially in each of the supports and axially projecting from one of said supports, a cross wall interiorly of the cylinder member and threaded axially upon the screw member for carrying the cylinder to and from the inlet valve seat as the screw is threaded into the cross wall in one direction or the other, and means arranged to restrain rotation of the cylinder member as the screw is rotated.

2. In a screw type valve including a chamber having an inlet at one end, an outlet at the opposite end and a valve seat about the inlet opening, a pair of narrow circular support members suspended in axial spaced parallel relation to one another within the chamber and in spaced relation to the surrounding wall of the chamber, an elongated open ended sleeve member fitted at one end over one of the supports in slidable contact therewith and fitted at the other end over the other support in slidable contact therewith, the wall of said sleeve member being spaced from the wall of said chamber to provide an annular flow passage, one end of the sleeve adapted to engage the valve seat when the sleeve is moved toward the inlet opening, a shoulder about one of the supports adapted to limit the extent of movement of the sleeve when the sleeve is moved in the direction away from the valve seat, a drive screw rotatably supported axially in the two support members and projecting axially from one of said supports, a rib mediately of the sleeve member and axially threaded upon the screw member, means for driving the screw, an elongated pin means extending from one of the support members freely into the rib for restraining rotatable movement of the sleeve member as the screw is driven.

3. A valve of the screw type useful for pressure air flow control comprised of a housing having a cylindrical valve head chamber with a circular inlet at one end and an outlet at the other end, said chamber having a larger diameter than said inlet and a transverse wall extending to said inlet, an annular valve seat in said wall adjacent said inlet, a tubular valve head in said chamber spaced from the wall thereof having a transverse rib section which has an inlet sleeve and an outlet sleeve extending axially from the periphery of each side of said rib section, the edge of said inlet sleeve arranged to seat on said annular valve seat, a narrow annular upstream support in said chamber adjacent said inlet slidably supporting said inlet sleeve at the inner surface thereof, a narrow annular downstream support in said chamber adjacent said outlet slidably supporting said outlet sleeve at the inner surface thereof, a screw axially-threaded through said rib section and mounted in bearings in each of said supports and axially projecting from one of said supports, means arranged to restrain rotation of said valve head when the screw is rotated so that said valve edge moves to and from said valve seat, and stop means on one of said supports arranged to limit the movement of said valve head away from said seat.

4. A valve as set forth in claim 3 wherein the stop means is an annular radially extending shoulder on the downstream support arranged so that the valve edge of said valve head in fully open position is adjacent the upstream end of said upstream support.

5. A valve as set forth in claim 3 wherein said rib section has a bleeder hole therethrough and each support has a seal in the periphery thereof.

6. An air flow control valve comprised of housing means providing a cylindrical inlet passage and a larger-diameter cylindrical valve head chamber with a transverse wall therebetween having an annular valve seat, two axially-aligned valve head supports in said chamber providing an axially-extending annular upstream surface and an axially-extending annular downstream surface, peripheral seals in said surfaces of said supports, a tubular valve head having a transverse annular rib section and two cylindrical sleeves of the same diameter axially-extending from each peripheral side of said rib section, the inner surfaces of said sleeves being slidably mounted on said upstream and downstream surfaces of said supports, the edge of the upstream sleeve arranged to contact said valve seat, the outer wall of said valve head being spaced from the surface of said chamber to provide an annular flow passage, said upstream support havnig arms connected to the part of the housing means providing the cylindrical inlet passage, said downstream support having arms extending to the part of said housing means providing the downstream part thereof, said downstream support having an annular extension which has a shoulder arranged to limit the edge of said upstream sleeve to a predetermined open position adjacent the outer end of said upstream support, a screw axially-threaded through said rib section and mounted in bearings in each of said supports, said screw projecting axially from said down stream support within said annular extension and having means thereon for imparting rotation to said screw, a pin extending from said outlet support and loosely-received in a rib opening in said rib wall for causing said valve head to advance and to retract upon rotation of said screw, said rib opening providing a passage for air from the spaces on each side of said rib section as said valve head is axially moved.

References Cited in the file of this patent
UNITED STATES PATENTS

| | | |
|---|---|---|
| 1,820,686 | Wise | Aug. 25, 1931 |
| 1,998,458 | Kinzie | Apr. 23, 1935 |

FOREIGN PATENTS

| | | |
|---|---|---|
| 18,813 | Switzerland | of 1899 |
| 577,981 | Germany | of 1933 |
| 222,605 | Switzerland | of 1942 |